(12) United States Patent
Totten et al.

(10) Patent No.: US 10,172,275 B2
(45) Date of Patent: Jan. 8, 2019

(54) PIVOTABLE LIFT ASSIST ASSEMBLY FOR AN AGRICULTURAL IMPLEMENT

(71) Applicant: CNH Industrial America LLC, New Holland, PA (US)

(72) Inventors: Kip Totten, Manheim, PA (US); Cale Boriack, Lititz, PA (US); Brian J. Anderson, Burr Ridge, IL (US); Marvin A. Prickel, Burr Ridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/394,198

(22) Filed: Dec. 29, 2016

(65) Prior Publication Data

US 2018/0184572 A1 Jul. 5, 2018

(51) Int. Cl.
| | | |
|---|---|---|
| *A01B 49/06* | (2006.01) | |
| *A01B 51/04* | (2006.01) | |
| *A01B 63/16* | (2006.01) | |
| *A01B 63/22* | (2006.01) | |

(52) U.S. Cl.
CPC .............. *A01B 63/16* (2013.01); *A01B 49/06* (2013.01); *A01B 51/04* (2013.01); *A01B 63/22* (2013.01)

(58) Field of Classification Search
CPC ......... A01B 49/06; A01B 49/04; A01B 49/00; A01B 51/04; A01B 51/00; A01B 63/22; A01B 63/16; A01B 63/14; A01B 63/00
See application file for complete search history.

(56) References Cited

U.S. PATENT DOCUMENTS

| | | |
|---|---|---|
| 2,224,971 A | 12/1940 | Lindgren et al. |
| 3,056,458 A | 10/1962 | Gray |
| 3,380,537 A | 4/1968 | Morkoski |
| 3,386,518 A | 6/1968 | Fisk |
| 3,700,041 A | 10/1972 | Ryan |
| 3,708,019 A | 1/1973 | Ryan |
| 3,876,012 A | 4/1975 | Regier |
| 3,879,012 A | 4/1975 | Regier |
| 3,976,302 A | 8/1976 | Hammarstrand |
| 4,108,089 A | 8/1978 | van der Lely |
| 4,216,975 A | 8/1980 | Schafer et al. |
| 4,253,528 A | 3/1981 | Sullivan et al. |
| 4,272,097 A | 6/1981 | Cornelius |
| 4,304,303 A | 12/1981 | Henry |
| 4,357,031 A | 11/1982 | Berg |
| 4,416,109 A | 11/1983 | Slazas |
| 4,534,575 A | 8/1985 | Grove et al. |
| 4,552,375 A | 11/1985 | Kinzenbaw |
| 4,594,951 A | 6/1986 | Grataloup |

(Continued)

*Primary Examiner* — Christopher J. Novosad
(74) *Attorney, Agent, or Firm* — Rebecca L. Henkel; Rickard K. DeMille

(57) ABSTRACT

In one embodiment, an agricultural implement system includes a pivotable lift assembly. The pivotable lift assembly includes a first bar member and a second bar member rotatively coupled to the first bar member. The pivotable lift assembly further includes a first wheel assembly disposed on a first end of the second bar member and a second wheel assembly disposed on a second end of the second bar member. The pivotable lift assembly also includes an attachment assembly configured to attach the pivotable lift assembly to an agricultural implement, wherein the pivotable lift assembly is configured to aid in carrying a weight of the agricultural implement.

17 Claims, 6 Drawing Sheets

(56) References Cited

U.S. PATENT DOCUMENTS

| | | |
|---|---|---|
| 4,750,751 A | 6/1988 | Schafer |
| 5,423,394 A | 6/1995 | Kendle |
| 6,012,724 A | 1/2000 | Pitkanen |
| 6,196,327 B1 | 3/2001 | Patel |
| 6,257,347 B1 | 7/2001 | Campisi |
| 6,371,215 B2 | 4/2002 | Friggstad |
| 6,915,862 B2 | 7/2005 | Deves et al. |
| 7,131,651 B2 | 11/2006 | Laursen |
| 7,644,941 B2 | 1/2010 | Kroth et al. |
| 8,186,449 B2 | 5/2012 | Hackert et al. |
| 8,555,995 B2 | 10/2013 | Harris |
| 8,943,788 B2 | 2/2015 | Miller et al. |
| 9,155,239 B2 | 10/2015 | Hatanaka et al. |
| 2012/0261146 A1 | 10/2012 | Bolten |
| 2012/0261899 A1 | 10/2012 | Ockunzzi |
| 2014/0214284 A1 | 7/2014 | Sauder et al. |

PIVOTABLE LIFT ASSIST ASSEMBLY FOR AN AGRICULTURAL IMPLEMENT

BACKGROUND

The invention relates generally to agricultural implements. Specifically, the embodiments disclosed herein generally relate to pivotable lift assist assemblies for agricultural implements.

Many types of agricultural implements are used for a variety of tasks, such as cultivating, tilling, planting, and harvesting. For example, seeders and planters are agricultural implements that include devices that create a trench in soil, deposit seeds into the trench, and fill the trench. A seeding/planting agricultural implement may include a central section or bar coupled to a tow bar and wing assemblies coupled to either side of the tow bar. The wing assemblies typically include tool bars that extend perpendicular from the tow bar, row units that perform the farming operation and are mounted on the tool bars, and supporting wheel assemblies disposed along the length of the tool bars. Likewise, other agricultural implements such as cultivators may include transverse members that extend perpendicularly from the tow bar.

During the farming operation, the agricultural implement may by towed by a towing vehicle such as a tractor. Further, the agricultural implement may include a lift assist device that may be, for example, coupled to the rear of the agricultural implement. The lift assist device may aid in accommodating some of the weight of the agricultural implement and may also be useful in transporting the agricultural implement. For example, when transporting the seeding/planting agricultural implement, the wing assemblies may be folded for compactness and thus wheels under the wing assemblies may no longer support some the weight of the agricultural implement. The lift assist device may support the weight of the agricultural implement, and thus be used for transport purposes. The lift assist device may additionally or alternatively be used to mount, for example, a bulk fill system or a fertilizer system onto the lift assist device to carry additional systems during farming operations. It would be beneficial to improve structural aspects of the lift assist device.

BRIEF DESCRIPTION

In one embodiment, an agricultural implement system includes a pivotable lift assembly. The pivotable lift assembly includes a first bar member and a second bar member rotatively coupled to the first bar member. The pivotable lift assembly further includes a first wheel assembly disposed on a first end of the second bar member and a second wheel assembly disposed on a second end of the second bar member. The pivotable lift assembly also includes an attachment assembly configured to attach the pivotable lift assembly to an agricultural implement, wherein the pivotable lift assembly is configured to aid in carrying a weight of the agricultural implement.

In another embodiment, a pivotable lift assembly system includes a first bar member and a second bar member rotatively coupled to the first bar member. The pivotable lift assembly further includes a first wheel assembly disposed on a first end of the second bar member and a second wheel assembly disposed on a second end of the second bar member. The pivotable lift assembly also includes an attachment assembly configured to attach the pivotable lift assembly to an agricultural implement, wherein the pivotable lift assembly is configured to aid in carrying a weight of the agricultural implement.

In a further embodiment, an agricultural implement system includes an agricultural implement and a pivotable lift assembly. The pivotable lift assembly includes a first bar member and a second bar member rotatively coupled to the first bar member. The pivotable lift assembly further includes a first wheel assembly disposed on a first end of the second bar member and a second wheel assembly disposed on a second end of the second bar member. The pivotable lift assembly also includes an attachment assembly configured to attach the pivotable lift assembly to the agricultural implement, wherein the pivotable lift assembly is configured to aid in carrying a weight of the agricultural implement.

DRAWINGS

These and other features, aspects, and advantages of the present invention will become better understood when the following detailed description is read with reference to the accompanying drawings in which like characters represent like parts throughout the drawings, wherein.

Figure 2:
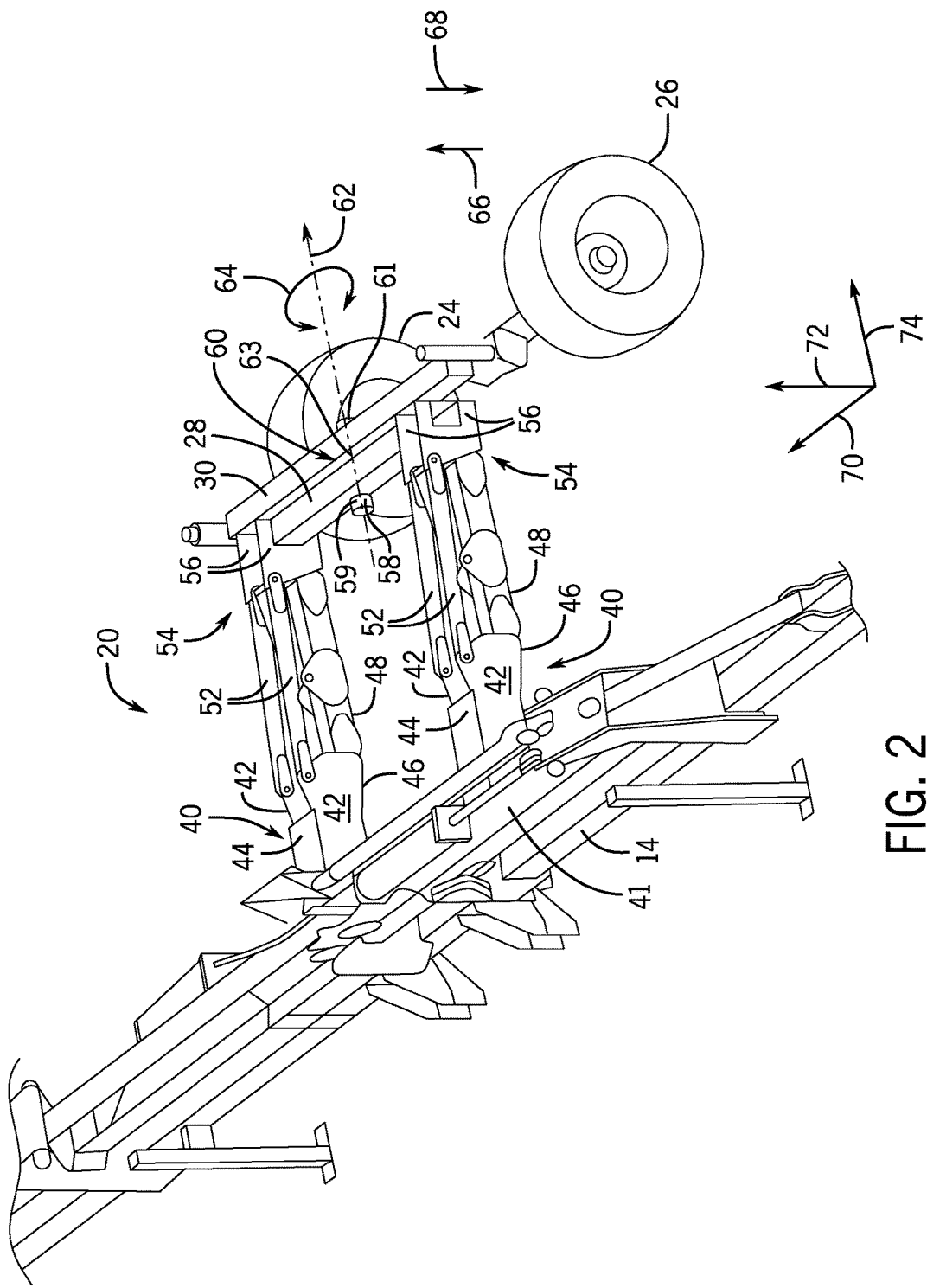
FIG. 2 is a front view of a pivot hinge assembly connecting two bar members, in accordance with an embodiment of the present approach.
Figure 5:
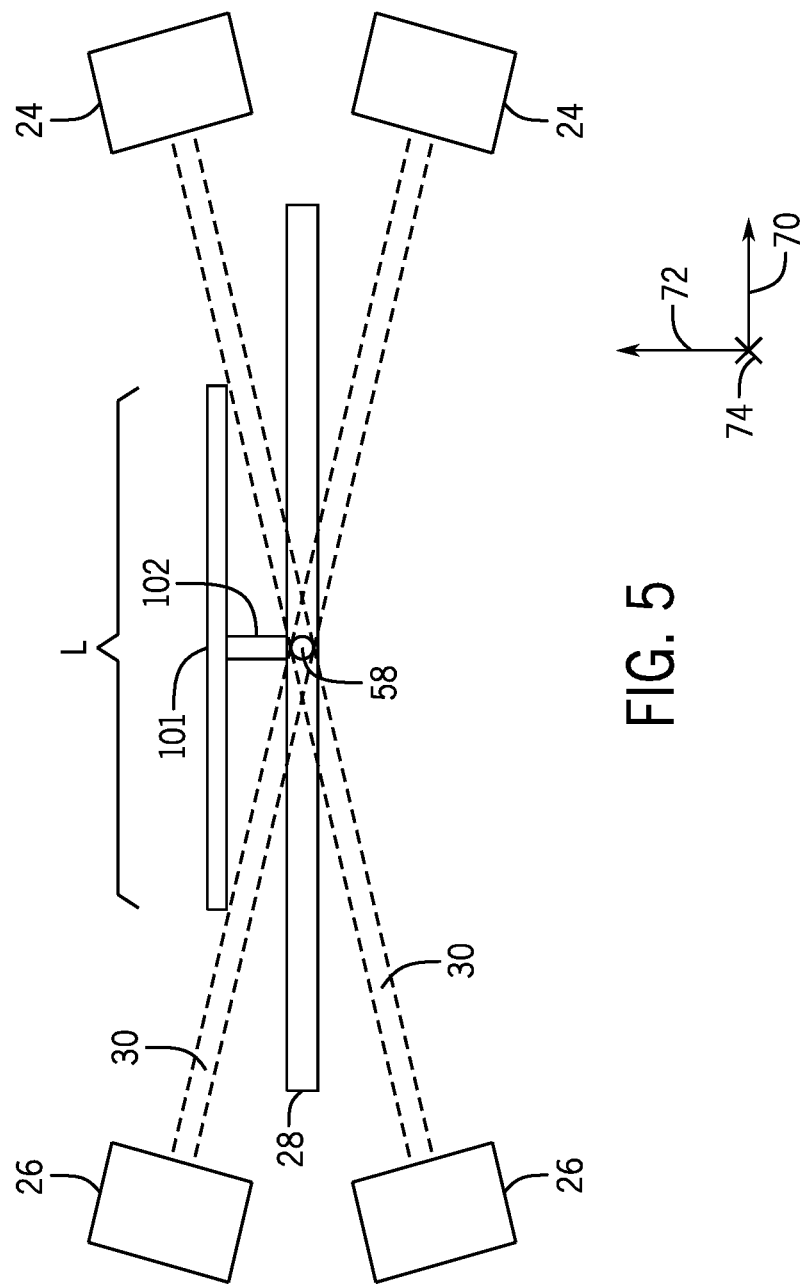
Figure 6:
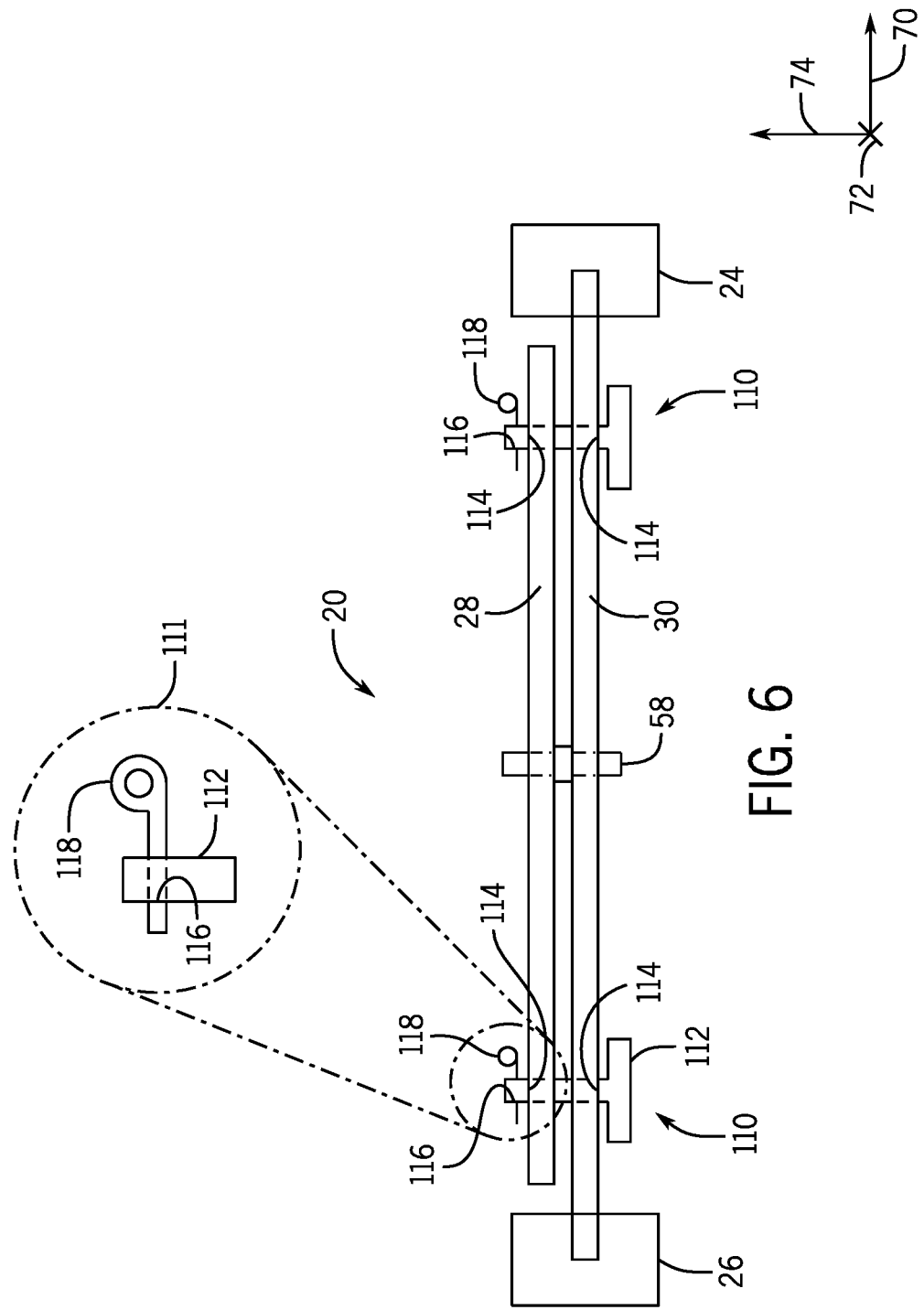

FIG. 5 is a front view of a pivot hinge assembly of FIG. 2 with a second tool bar member pivoted upwards over and above a height of a first tool bar member, in accordance with an embodiment of the present approach; and FIG. 6 is a perspective view of the pivot hinge assembly of FIG. 2 illustrating details of end members coupled to tool bar members, in accordance with an embodiment of the present approach.

DETAILED DESCRIPTION

Agricultural implements, for example, planters, may include wing wheel assemblies to support the implement during various modes of operation (e.g., while turning at a headland, while operating in a planting mode, while transporting the implement, etc.). The wing wheel assemblies may be coupled to a pivotable lift assembly suitable for supporting some of the agricultural implement's weight as well as useful in carrying other systems, such as bulk fill systems, fertilizer systems, and the like. Indeed, a variety of agricultural implements, including implements that are commonly used to perform a variety of tasks (e.g., spraying implements for applying fertilizer, implements for harvesting agricultural product, plowing, preparing beds, etc.) may include the pivotable lift assembly described herein.

With agricultural implements that are provided with the pivotable lift assist assembly described herein, the pivotable lift assist assembly may rotate generally about a fore-aft axis to allow for ground contour compensation. Such pivotable structure may reduce structural stress in a ground engaging implement frame. Further, the pivotable lift assist assembly may reduce compaction, for example, when utilizing a bulk fill or fertilizer system on a mounted planter by allowing approximate equal weight on both tire sets. Indeed, rather than ride on a single wheel, in certain ground conditions (e.g., uneven ground conditions), the pivotable lift assist assembly may include a pivot generally about the fore-aft axis, which may advantageously provide for more even weight distribution among the tire sets. Accordingly, the pivotable lift assist assembly may compensate for ground contours and provide for less compaction.

Figure 1:
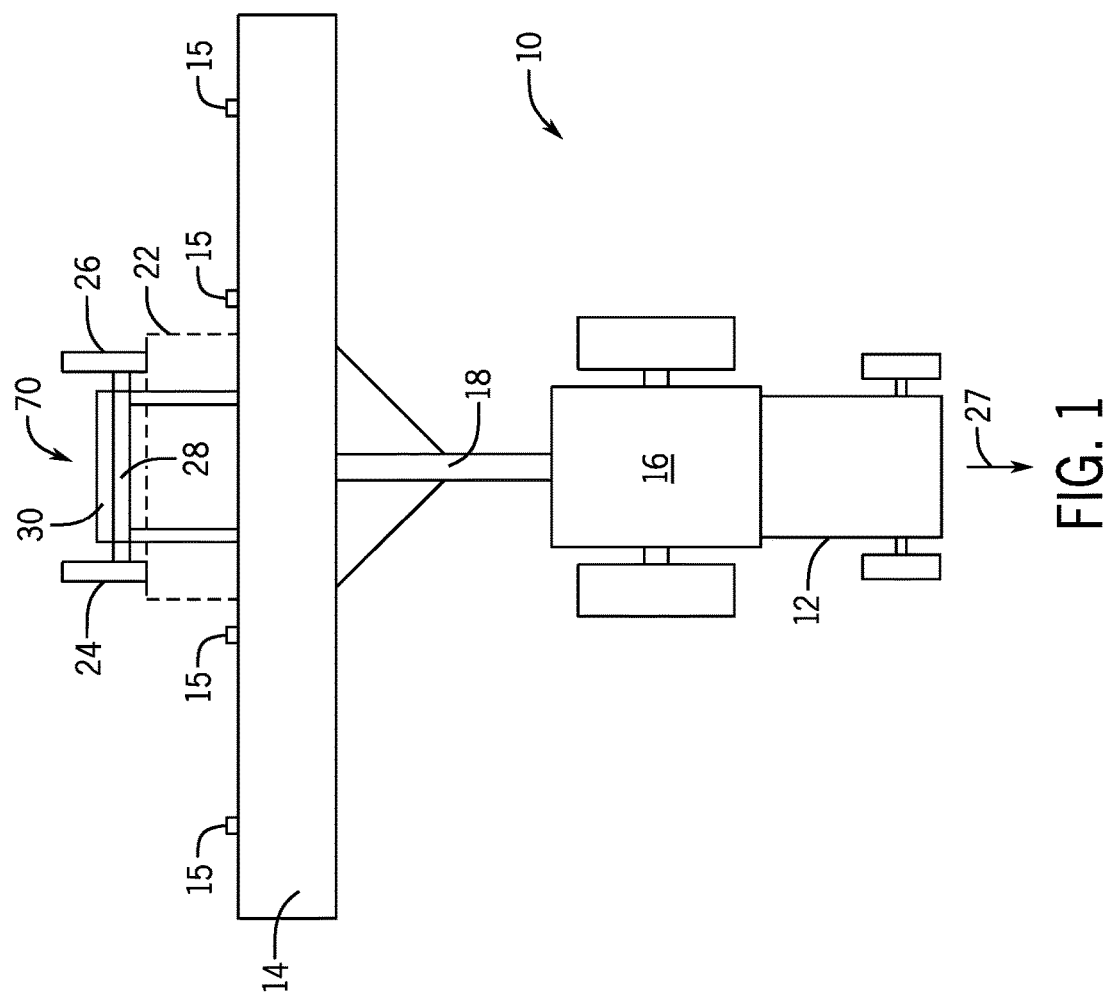
FIG. 1 is a top block view of an agricultural implement that may include a pivotable lift assist assembly suitable for pivoting and extending certain bar members of the pivotable lift assembly.

With the foregoing in mind, FIG. 1 is a top block view of an embodiment of an agricultural system 10. The agricultural system 10 includes an agricultural vehicle 12 and an agricultural implement 14. In some embodiments, the agricultural implement 14 may be towed behind the agricultural vehicle 12 (e.g., as shown in FIG. 1). The agricultural vehicle 12 may be any vehicle suitable for towing the agricultural implement 14, such as a tractor, off-road vehicle, work vehicle, or the like. The agricultural vehicle 12 may include a cab 16, in which an operator sits during operation of the agricultural vehicle 12. The cab 16 may be an open or closed cab 16. Additionally, the agricultural implement 14 may be any suitable implement, such as a ground-engaging implement (e.g., a soil conditioner, a tillage implement, a fertilizer application implement, a planter, a seeder, etc.) or a sprayer/applicator, suitable for agricultural use. The agricultural implement 14 may be coupled to the agricultural vehicle 12 via a hitch system 18. The hitch 18 may be a two-point or three-point hitch that rigidly couples the agricultural implement 14 to the vehicle 12, such that the implement 14 can move upward and downward, but cannot freely rotate with respect to the vehicle 12. It should be understood, however that other systems for coupling the implement 14 to the vehicle 12 may be possible. In some embodiments, the implement 14 may be coupled to the front of the vehicle 12.

As the agricultural implement is towed by the vehicle 12, some of the weight of the agricultural implement is distributed among wheels 15. Some of the weight is also being distributed to a pivotable lift assembly 20. Moreover, if the agricultural implement 14 includes folding components, some of the wheels 15 may be folded so as to lift them out of contact with the ground. Additionally wheel 15 may be raised to lift them out of contact with the ground. Accordingly, the pivotable lift assembly 20 may support more of the agricultural implement's weight when some of the wheels 15 are lifted out of contact with the ground.

Indeed, the pivotable lift assist assembly 20 is suitable for engaging the ground to aid in weight distribution of the agricultural implement 14 and may include certain pivotable embodiments to enable a more even transport of the agricultural implement 14. In some embodiments, the pivotable lift assist assembly 20 may include a mounted agricultural system 22, such as a bulk fill system, a fertilizer system, and so on, shown in dashed lines. The pivotable lift assist assembly 20 also includes at least two wheel assemblies 24, 26, each assembly having one or more wheels. As further described herein, the wheel assemblies 24, 26, may move up and down with respect to ground and independent of one another. Accordingly, as the agricultural system 10 travels over a surface, such as the ground, a road, a field, or another surface in a direction of travel 27, a first (e.g. fore) bar member 28 and/or a second (e.g., aft bar member 30) may pivot about a pivot point described in more detail below, enabling the up and down movement of the wheel assemblies 24, 26. The pivotable lift assembly 20 may thus enable a more comformable tow that follows ground contours and that may lead to less compaction of soil. It is to be noted that the first bar member 28 may be disposed fore of the second bar member 30 with respect to attachment assemblies, aft of the second bar member 30 with respect to attachment assemblies, above the second bar member 30 with respect to ground, or below the second ground member 30 with respect to ground.

Turning now to FIG. 2, is a perspective view illustrating an embodiment of the pivotable lift assist assembly 20 mechanically coupled to an embodiment of the agricultural implement 14. Because the figure includes like elements from the figure above, the like elements include like element numbers. In the depicted embodiment, the pivotable lift assembly 20 is connected to the agricultural implement 14 via two attachment assemblies 40. The attachment assemblies 40 may be used to permanently and/or temporarily attach the pivotable lift assist assembly 20 to the agricultural implement 20. For example, when permanently attached, the attachment assemblies 40 may be welded to the agricultural implement 14, such as to frame 41. When temporarily attached, the attachment assemblies 40 may be secured by a variety of fastening techniques, including nuts/bolts, latches, screws, and so on.

The attachment assemblies 40 include two side metal plates 42, a top plate 44, and/or a bottom plate (not shown). Bottom portions 46 of the attachment assemblies 40 may be mechanically coupled to square bar members 48 that extend radially away and outwardly from the attachment assemblies 40. Top portions 50 of the attachment assemblies 40 may be mechanically coupled to support members 52, such as tubular structures, elongated metal plates, rods, and the like. The square bar members 48 and the support members 52 may then be mechanically coupled to the fore bar member 28, for example, via two attachment assemblies 54.

Each of the two attachment assemblies 54 may include side metal plates 56 having a square opening or "cut" suitable for disposing the fore bar member 28 inside of said opening. The fore bar member 28 may then be welded or otherwise securely fastened onto the attachment assemblies 54. The fore bar member 28 attached to the tubular bar members 48 and then attached to the agricultural implement 14 forms a rigid square shape. The aft bar member 30 is then attached to the fore bar member 28, for example, by using a bolt and nut (e.g., pivoting) assembly 58. The bolt and nut assembly 58 enables a rotation or pivoting of the aft bar member 30 with respect to the fore bar member 28. Accordingly, a pivot point 60 may be defined via a fore-aft axis 62, about which a rotation 64 of the aft bar member 30 may be enabled. The assembly 58 may include a bolt 59, a nut 61, and a flange system 63. The flange system 63 in turn may include one or more flanges and/or a washers that may reduce rotative friction between the bar members 28, 30.

As the aft bar member 30 rotates about the axis 62, the wheel assemblies 24, 26 may move in an up direction 66 and a down direction 68 with respect to ground. Accordingly, ground contours may be more comformably traveled. Also shown in perspective are an axis 70, 72, 74. The axis 74 is parallel to the fore-aft axis 62, while axes 70 and 72 are both perpendicular to the fore-aft axis 62. A surface perpendicular to the pivot axis 62 may control fore-aft movement and yaw between the pivotable lift assembly 20 and the frame 41, and may include a pad, a plate, a clip, a roller, and so on.

Figure 3:
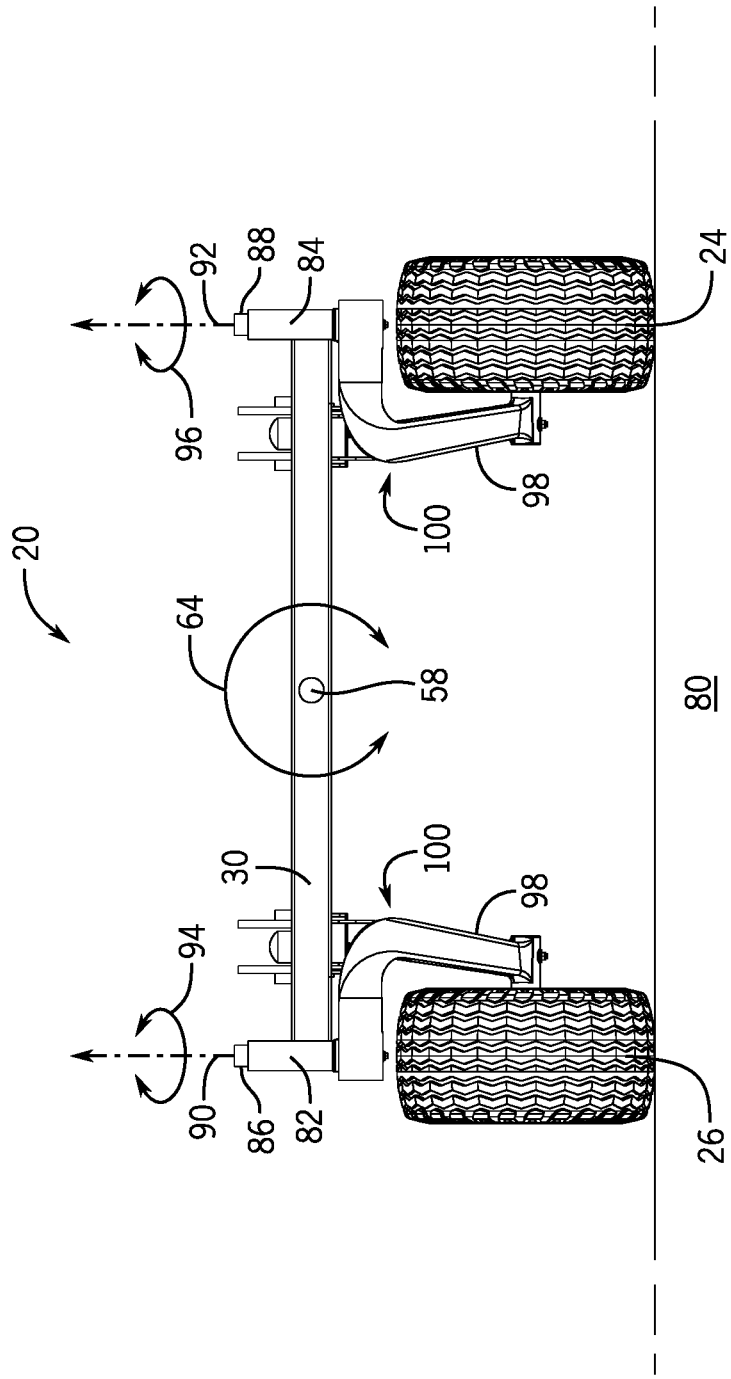
FIG. 3 is a front view of a pivot hinge assembly of FIG. 2 with a tool bar member pivoted towards the ground, in accordance with an embodiment of the present approach.

FIG. 3 is a front view of an embodiment of the pivotable lift assembly 20 illustrating the wheel assemblies 24, 26 as having the same height with respect to ground 80. Because the figure utilizes like elements as those found in the figures above, the like elements are illustrated using like element numbers. As shown, the figure illustrates the pivotable lift assembly 20 disposed in a mostly even ground 80. Also shown are cylindrical members 82, 84, suitable for coupling with rotatable members 86, 88. In operation, the rotatable members 86, 88, may rotate about axes 90, 92 respectively. For example, rotations 94 and 96 are shown for the rotatable members 86, 88. The rotations 94, 96 may include 360° or more. Indeed, in use, the wheel assemblies 24, 26 may rotate freely in any direction in any number of degrees.

The wheels for assemblies 24, 26, may be mounted onto arm members 98, suitable for rotatably coupling with the cylindrical members 82, 84, for example, via the rotatable members 86, 88. In one embodiment, the rotatable members 82, 84, may include rods that engage the cylindrical members 82, 84, for example, via a bearing system. Other embodiments of the rotatable members 86, 88 may include ball joints, hub assemblies, and the like. The arms are shown, in an exemplary embodiment, as having a curved section 100 that enables the wheels in the assemblies 24, 26 to be disposed more axially aligned with the cylindrical members 82, 84, e.g., directly under the cylindrical members 82, 84.

Figure 4:
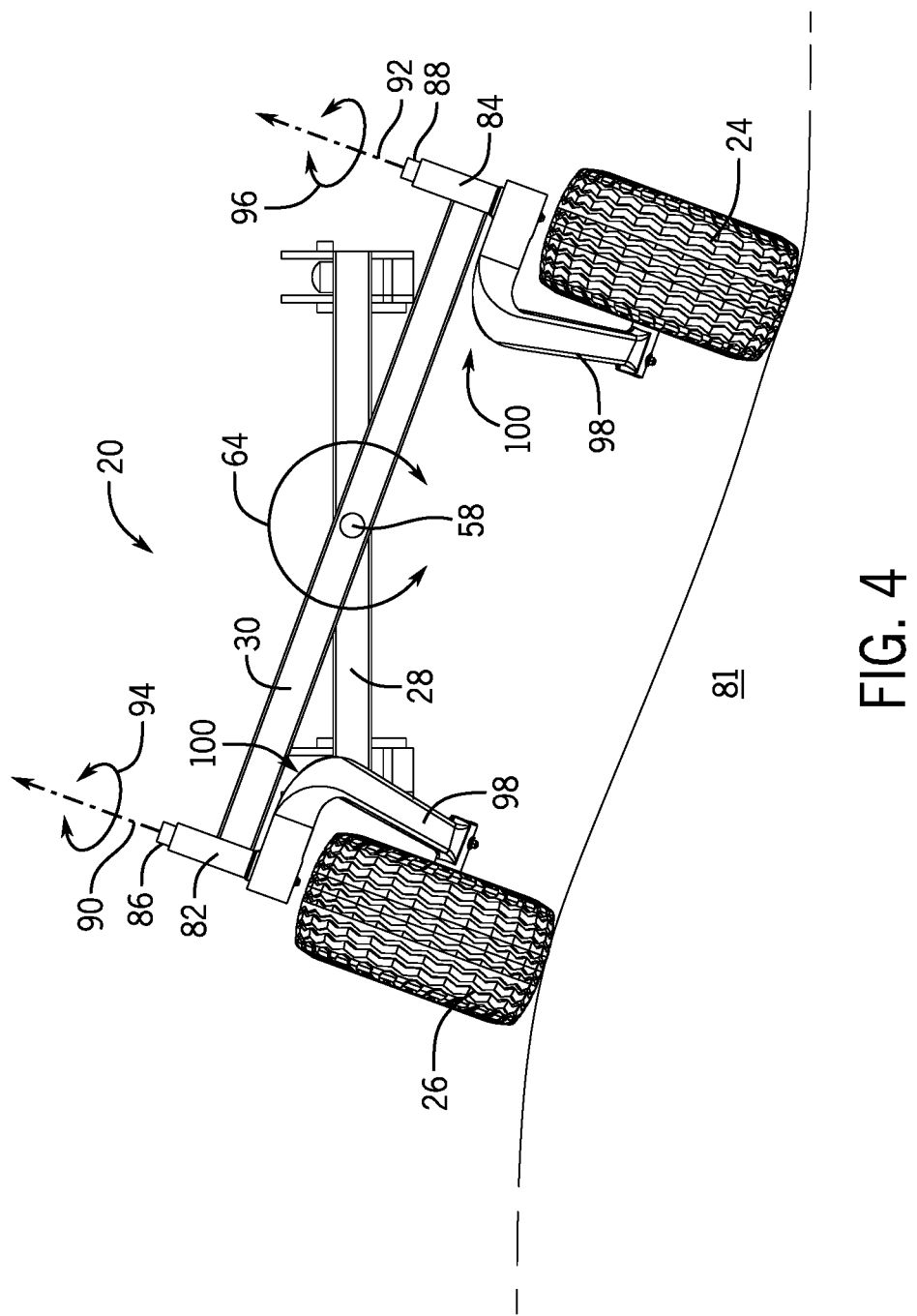
FIG. 4 is a front view of a pivot hinge assembly of FIG. 2 with a tool bar member pivoted towards ground and extended to respect a distance D between row unit attachment members, in accordance with an embodiment of the present approach.

While arms 98 are shown, other embodiments may add or include a variety of wheel suspension systems, including but not limited to wishbone suspension, swing axles, trailing link suspension, MacPherson suspension, A-arm suspensions, and so on. Also shown is a front view of the bolt and nut assembly 58, about which the rotation 64 of the aft bar member 30 may be provided. Indeed, as shown in FIG. 4. The aft bar member 30 may rotate about the bolt and nut assembly 58, for example, to better follow ground contours.

More specifically, FIG. 4 is a front view illustrating an embodiment of the pivotable lift assist assembly 20 illustrating the wheel assemblies 24, 26 as having the different heights with respect to uneven ground 81. Because the figure includes like elements from the figures above, the like elements include like element numbers. As the pivotable lift assist assembly 20 travels through various types of ground, the wheel assemblies 24, 26, may more comfortably follow ground contours by pivoting up and down. Accordingly, stresses in components of the pivotable lift assist assembly 20 and/or the implement 14 may be reduced. Further, because both wheel assemblies 24, 26 may now contact the ground 81 more comfortably and with more even weight distribution, ground compaction may be reduced.

Indeed, by adding rotation 64 capabilities to the pivotable lift assembly 20, the agricultural implement 14 may also experience a reduced stress and more even weight distribution as the pivotable lift assist assembly 20 may now more easily traverse through variety of ground conditions. As shown, the unlocked second bar member 30 remains parallel to ground 81 under the bar member 30 (e.g., ground under the wheel assemblies 24, 26) while the pivotable lift assembly enables a rotation of the attachment assemblies 40 with respect to the ground 81. In some situations, it may be desirable to limit an amount of rotation or travel of the aft bar member 30, for example, with respect to the fore bar member 28. Accordingly, a stop travel member, such as a stop travel member 101 shown in FIG. 5, may be used to provide rotational limits to the aft bar member 30.

More specifically FIG. 5 is a block front view of the pivotable lift assembly 20 illustrating an embodiment of the stop travel member 101 suitable for abutting against the aft bar member 30, thus limiting travel of the aft bar member 30. It is to be noted that the figure is a block figure and thus the components shown may not be to scale, and/or to scale with respect to each other. The figure also includes the axes 70, 72, and 74 also described in FIG. 2. Because the FIG. 5 includes like elements from the figures above, the like elements include like element numbers. In the figure, the stop travel member 101 may be disposed to project above (e.g., "overhang") the aft bar member 30 so that when the aft bar member 30 rotates, the aft bar member 30 may contact the stop travel member 101. In the depicted embodiment, the stop travel member 101 may be attached to various components, such as to the fore bar member 28, via attachment piece 102.

The stop travel member 101 may be any length, such as a length L between 1 in. and 5 ft or more. Extending the length of the stop travel member 100 and/or lowering the stop travel member 101 closer to the aft bar member 30 may result in less travel or rotation of the aft bar member 30. Likewise, decreasing the length of the stop travel member 101 and/or raising the stop travel member 101 farther from the bar member 30 may result in more travel of the aft bar member 30. In some embodiments, such as when the mounted agricultural system 22 is mounted above the aft bar member 30, the stop travel member 101 may be mounted below the aft bar member 30 as opposed to above the aft bar member 30.

Turning now to FIG. 6, the figure is a block top view of the embodiment of the pivotable lift assembly 20 illustrating certain locking techniques that may be used. Because the figure includes like elements from the figures above, the like elements include like element numbers. In certain uses, such as during transport, it may be beneficial to "lock" the rotational component(s) of the pivotable lift assembly 20. For example, the aft bar member 30 may be securely fastened onto the fore bar member 28 to minimize or eliminate any movement, such as rotational movement. Accordingly, FIG. 6 illustrates two locking assemblies 110 suitable for fastening the fore bar member 28 to the aft bar member 30. More specifically, the figure is a block diagram top view of the two bar members 28, 30 showing details 111 of the locking assemblies 110. The figure also includes the axes 70, 72, and 74 also described in FIG. 2.

In the depicted embodiment, the locking assembly 110 includes a key or locking member 112. When in use, the locking member may first be inserted through openings 114 disposed in both of the bar members 28, 30 so that an opening 116 protrudes behind the fore bar member 28. Following the insertion of the locking member 112, a pin (e.g., cotter pin) 118 may be inserted through the opening 116 to secure the locking member 112. While the depicted embodiment shows the locking assembly 110 disposed in two locations, the location assembly 110 may be disposed in one or more locations along lengths of the bar members 28, 30. In this manner, the locking assembly or assemblies 110 may be used, for example, during road transport of the pivotable lift assembly 20.

Also shown are the bolt and nut assembly 58 and the flange system 63. As mentioned earlier, the aft bar member 30 may pivot with respect to the fore bar member 28 about the bolt and nut assembly 58. The flange system 63 may include smooth flanges (e.g., steel, PVC, ABS, plastic) that would minimize friction between the aft bar member 30 and the fore bar member 28, enabling a smoother rotation. By providing a pivotable lift assembly 20, the techniques described herein may provide for more comfortable towing of agricultural implements 14, thus extending equipment life and improving yields.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement system, comprising:
a pivotable lift assembly comprising:
a first bar member;
a second bar member rotatively coupled to the first bar member, wherein the first bar member and the second bar member are parallel with each other and a ground along a lengthwise axis when the pivotable lift assembly is on even ground;
a first wheel assembly disposed on a first distal end of the second bar member;
a second wheel assembly disposed on a second distal end of the second bar member,
wherein a first arm member carries the first wheel assembly and is rotatively coupled to the first end of the second bar member and the first wheel assembly enables a first rotation of a first wheel along a first axis of rotation that is perpendicular to the lengthwise axis, and a second arm member carries the second wheel assembly and is rotatively coupled to the second end of the second bar member and the second wheel assembly enables a second rotation of a second wheel along a second axis of rotation that is perpendicular to the lengthwise axis; and
an attachment assembly configured to attach the pivotable lift assembly to an agricultural implement, wherein the pivotable lift assembly is configured to aid in carrying a weight of the agricultural implement.

2. The agricultural implement system of claim 1, wherein the pivotable lift assembly comprises a pivotable assembly rotatively coupling the first bar member to the second bar member, wherein the pivotable assembly defines a single pivot point having a fore-aft axis of rotation with respect to the attachment assembly, and wherein the fore-aft axis of rotation is perpendicular to the lengthwise axis, the first axis of rotation, and the second axis of rotation.

3. The agricultural implement system of claim 2, wherein the pivotable assembly comprises a pin assembly having a flange system disposed between the first bar member and the second bar member.

4. The agricultural implement system of claim 1, wherein the first end of second bar member comprises a first cylinder and the second end of the second bar member comprises a second cylinder, wherein the first arm member comprises a first rotatable member disposed inside of the first cylinder so as to rotatably couple the first arm member to the first end of the second bar member and the second arm member comprises a second rotatable member disposed inside of the second cylinder so as to rotatably couple the second arm member to the second end of the second bar member.

5. The agricultural implement system of claim 4, wherein the first arm member is rotatably coupled to freely rotate 360 degrees about the first cylinder and wherein the second arm member is rotatably coupled to freely rotate 360 degrees about the second cylinder.

6. The agricultural implement system of claim 1, wherein the pivotable lift assembly comprises a locking assembly securely locking the first bar member to the second bar member.

7. The agricultural implement system of claim 6, wherein the locking assembly comprises a locking key member configured to be inserted through the second bar member and the first bar member to lock the second bar member to the first bar member.

8. The agricultural implement system of claim 1, wherein the pivotable lift assembly comprises a stop travel member, wherein the second bar member abuts the stop travel member after moving a desired distance relative to the first bar member.

9. The agricultural implement system of claim 1, comprising the agricultural implement coupled to the pivotable lift assembly via the attachment assembly, wherein the agricultural implement comprises a soil conditioner, a tillage implement, a fertilizer application implement, a planter, a seeder, or a combination thereof, and wherein the first wheel assembly and the second wheel assembly each comprise at least one wheel.

10. A pivotable lift assembly system, comprising:
a first bar member;
a second bar member rotatively coupled to the first bar member;
a first wheel assembly disposed on a first distal end of the second bar member;
a second wheel assembly disposed on a second distal end of the second bar member, wherein the first bar member and the second bar member are parallel with each other and a ground along a lengthwise axis when the pivotable lift assembly is on even ground;
wherein a first arm member carries the first wheel assembly and is rotatively coupled to the first end of the second bar member and the first wheel assembly enables a first rotation of a first wheel along a first axis of rotation that is perpendicular to the lengthwise axis, and a second arm member carries the second wheel assembly and is rotatively coupled to the second end of the second bar member and the second wheel assembly enables a second rotation of a second wheel along a second axis of rotation that is perpendicular to the lengthwise axis; and
an attachment assembly configured to attach the pivotable lift assembly to an agricultural implement, wherein the pivotable lift assembly is configured to aid in carrying a weight of the agricultural implement.

11. The pivotable lift assembly system of claim 10, comprising a pivotable assembly rotatively coupling the first bar member to the second bar member, wherein the pivotable assembly defines a single pivot point having a fore-aft axis of rotation, and wherein the fore-aft axis of rotation is perpendicular to the lengthwise axis, the first axis of rotation, and the second axis of rotation.

12. The pivotable lift assembly system of claim 10, comprising a locking assembly securely locking the first bar member to the second bar member, wherein the first bar member is disposed fore of the second bar member with respect to the attachment assembly, aft of the second bar member with respect to the attachment assembly, above the second bar member with respect to ground, or below the second ground member with respect to ground.

13. The pivotable lift assembly system of claim 10, comprising a stop travel member, wherein the second bar member abuts the stop travel member after moving a desired distance relative to the first bar member.

14. An agricultural implement system, comprising:
an agricultural implement; and
a pivotable lift assembly comprising:
a first bar member;
a second bar member rotatively coupled to the first bar member, wherein the first bar member and the second bar member are parallel with each other and a ground along a lengthwise axis when the pivotable lift assembly is on even ground;

a first wheel assembly disposed on a first distal end of the second bar member;

a second wheel assembly disposed on a second distal end of the second bar member, wherein a first arm member carries the first wheel assembly and is rotatively coupled to the first end of the second bar member and the first wheel assembly enables a first rotation of a first wheel along a first axis of rotation that is perpendicular to the lengthwise axis, and a second arm member carries the second wheel assembly and is rotatively coupled to the second end of the second bar member and the second wheel assembly enables a second rotation of a second wheel along a second axis of rotation that is perpendicular to the lengthwise axis; and an attachment assembly configured to attach the pivotable lift assembly to the agricultural implement, wherein the pivotable lift assembly is configured to aid in carrying a weight of the agricultural implement.

15. The agricultural implement system of claim 14, wherein the pivotable lift assembly comprises a pivotable assembly rotatively coupling the first bar member to the second bar member, wherein the pivotable assembly defines a single pivot point having a fore-aft axis of rotation, and wherein the fore-aft axis of rotation is perpendicular to the lengthwise axis, the first axis of rotation, and the second axis of rotation.

16. The system of claim 14, wherein the pivotable lift assembly comprises a locking assembly securely locking the first bar member to the second bar member, and wherein when unlocked, the second bar member remains parallel to a ground while the pivotable lift assembly enables a rotation of the attachment assembly with respect to the ground.

17. The agricultural implement system of claim 14, wherein the pivotable lift assembly comprises a stop travel member, wherein the second bar member abuts the stop travel member after moving a desired distance relative to the first bar member.

* * * * *